United States Patent [19]
Takano et al.

[11] Patent Number: 5,632,030
[45] Date of Patent: May 20, 1997

[54] DISPLAY CONTROL SYSTEM CAPABLE OF PROCESSING A PLURALITY OF CONTINUOUS DISPLAY UPDATING COMMAND SIMULTANEOUSLY

[75] Inventors: Hajime Takano; Hiroshi Matsuura, both of Tokyo, Japan

[73] Assignee: NEC Corporation, Tokyo, Japan

[21] Appl. No.: 510,680

[22] Filed: Aug. 3, 1995

[30] Foreign Application Priority Data

Aug. 4, 1994 [JP] Japan .................................. 6-182685

[51] Int. Cl.$^6$ .................................................. G06T 1/00
[52] U.S. Cl. ......................... 395/522; 345/133; 395/502
[58] Field of Search ........................... 395/501, 502, 395/522, 507; 345/10, 24, 27, 112, 133, 185, 189, 199, 213

[56] References Cited

U.S. PATENT DOCUMENTS 4,783,648  11/1988  Homma et al. ..................... 345/120

FOREIGN PATENT DOCUMENTS 121679  5/1995  Japan ............................. G06F 3/14

OTHER PUBLICATIONS

Oliver Jones, "Introduction to the X Window System", Ascii Publisher, 1990, pp. 1–34.

Primary Examiner—Kee M. Tung
Attorney, Agent, or Firm—Sughrue, Mion, Zinn, Macpeak & Seas

[57] ABSTRACT

In a display control system, when a continuous command requiring a continuous display updating process on a display screen is received from an application software, a corresponding display processing sequence is produced and stored in a time table. The time table defines titles of subroutines to be executed in terms of time. A timer interrupt routine is executed at every given timing for looking into the time table and identifying the subroutine to be executed at that time point, and for calling and executing the identified subroutine. Accordingly, the identified subroutines are executed in turn in the timer interrupt routines so as to accomplish the continuous display updating process. Since the continuous display updating process is executed as timer interruption, a simple command requiring a simple display updating process or a further continuous command can be received and processed while the former continuous display updating process is executed.

8 Claims, 6 Drawing Sheets

| TIME (ms) | COMMAND 1 | | |
|---|---|---|---|
| | SUBROUTINE TITLE | ARGUMENT | |
| 50 | TRANSLUCENCE | $\alpha = 95\%$ | ~51 |
| 100 | TRANSLUCENCE | $\alpha = 90\%$ | ~52 |
| 150 | TRANSLUCENCE | $\alpha = 85\%$ | ~53 |
| ⋮ | ⋮ | ⋮ | |
| 800 | TRANSLUCENCE | $\alpha = 20\%$ | ~54 |
| ⋮ | ⋮ | ⋮ | |
| 1000 | TRANSLUCENCE | $\alpha = 0\%$ | ~55 |

FIG. 7

| TIME (ms) | COMMAND 1 | | COMMAND 2 | | |
|---|---|---|---|---|---|
| | SUBROUTINE TITLE | ARGUMENT | SUBROUTINE TITLE | ARGUMENT | |
| 800 | TRANSLUCENCE | $\alpha = 20\%$ | TRANSLUCENCE | $\alpha = 95\%$ | ~61 |
| 850 | TRANSLUCENCE | $\alpha = 15\%$ | TRANSLUCENCE | $\alpha = 90\%$ | ~62 |
| ⋮ | ⋮ | ⋮ | — | — | |
| 1000 | TRANSLUCENCE | $\alpha = 0\%$ | TRANSLUCENCE | $\alpha = 75\%$ | ~63 |
| 1050 | — | — | TRANSLUCENCE | $\alpha = 70\%$ | ~64 |
| ⋮ | ⋮ | ⋮ | — | — | |
| 1750 | — | — | TRANSLUCENCE | $\alpha = 10\%$ | ~65 |
| 1800 | — | — | TRANSLUCENCE | $\alpha = 5\%$ | ~66 |
| 1850 | — | — | TRANSLUCENCE | $\alpha = 0\%$ | ~67 |

FIG. 8

DISPLAY CONTROL SYSTEM CAPABLE OF PROCESSING A PLURALITY OF CONTINUOUS DISPLAY UPDATING COMMAND SIMULTANEOUSLY

BACKGROUND OF THE INVENTION

The present invention relates to a display control system and a display control method, particularly, for use in the screen display system.

As one of the most popular screen display systems, the X Window System is known which is a window system for running on the UNIX OS. The X Window System is described in a literature, such as, "Introduction to The X Window System" written by Oliver Jones, edited by Tohru Nishimura and published by the Ascii Press in 1990. The X Window System is basically composed of an X server actually performing a screen display process and an X client issuing screen display commands according to behavior of an executed application software. The screen display commands and processing thereof comprise a window managing function including, such as, generating, destroying and changing a window, and a function of graphics primitive drawing into the window.

In Japanese Patent Application No. 263879/1993 (Japanese Patent Prepublication No. 121679/1995) by one of the present inventors, a conventional display control system is described in which, when a command is fed from an application software to a display processing section, the display processing section produces a display processing sequence so as to perform a consecutive or continuous display updating process in the manner which will later be described in detail in conjunction with the drawing.

However, the foregoing conventional display control system can not receive a new display updating command from the application software until completion of the display updating process. Thus, while processing continuous commands, it is impossible to process other simple command/commands and/or continuous command/commands, meaning that it is disabled to achieve visual effects based on the continuous commands simultaneously for a plurality of the windows, or execute a segment drawing while processing the continuous commands to provide a visual effect.

SUMMARY OF THE INVENTION

It is therefore an object of the present invention to provide an improved display control system and an improved display control method. Specifically, it is an object of the present invention to provide a display control system and a display control method which are, respectively, capable of processing a plurality of continuous display updating commands simultaneously and processing a simple display updating command while processing a continuous display updating command.

Other objects of this invention will become clear as the description proceeds.

According to an aspect of the present invention, there is provided a display control system for performing a screen display. The display control system comprises command receiving means for receiving a display updating command from an application software to produce a received display updating command, command discriminating means connected to the command receiving means for determining whether the received display updating command is a simple command requiring a simple display updating process or a continuous command requiring a continuous display updating process, simple command processing means connected to the command discriminating means for executing a screen updating process in response to the simple command, continuous command processing means connected to the command discriminating means and responsive to the continuous command for producing a display processing sequence defining a processing procedure for updating the screen display as required by the continuous command, time table storing means connected to the continuous command processing means for storing a time table to be written with the display processing sequence, subroutine activating means connected to the time table storing means and periodically activated for looking into the time table and activating a subroutine to be activated at that time point, subroutine processing means connected to the subroutine activating means for executing the subroutine, and display updating means connected to the simple command processing means, the subroutine processing means, and the the screen display for reflecting a process result of the simple command processing means or the subroutine processing means on the screen display.

According to another aspect of the present invention, there is provided a display control method of performing a screen display. The display control method comprises the steps of receiving a display updating command from an application software, determining whether the received display updating command is a simple command requiring a simple display updating process or a continuous command requiring a continuous display updating process, updating, when the received display updating command is the simple command, the screen display in response to the simple command, producing, when the received display updating command is the continuous command, a display processing sequence, setting the display processing sequence in a time table and starting a timer, and looking into the time table and executing a display updating process identified in the time table for that time point, as a timer interruption which is caused at every given timing defined by the timer, so as to perform the display updating process consecutively.

According to still another aspect of the present invention, there is provided a display control system for performing a screen display. The display control system comprises receiving means for receiving a display updating command from an application software to produce a received display updating command, determining means connected to the receiving means for determining whether the received display updating command is a simple command requiring a simple display updating process or a continuous command requiring a continuous display updating process, producing means connected to the determining means and responsive to the continuous command for producing a display processing sequence for updating the screen display as required by the continuous command, storing means connected to the producing means for storing, as a stored display processing sequence, the display processing sequence in such a form that identifies display updating processes to be executed in terms of time, periodically accessing means connected to the storing means for periodically accessing the stored display processing sequence to execute required one of the display updating processes in terms of time, the periodic access and execution being performed as a timer interruption which is caused at every given timing, and updating means connected to the screen display and the periodically accessing means for updating the screen display every time the periodically accessing means executes the required one of the display updating processes.

BRIEF DESCRIPTION OF THE DRAWING

FIG. 7 is a diagram showing an example of a time table; and

FIG. 8 is a diagram showing another example of a time table.

DESCRIPTION OF THE PREFERRED EMBODIMENT

Figure 1:
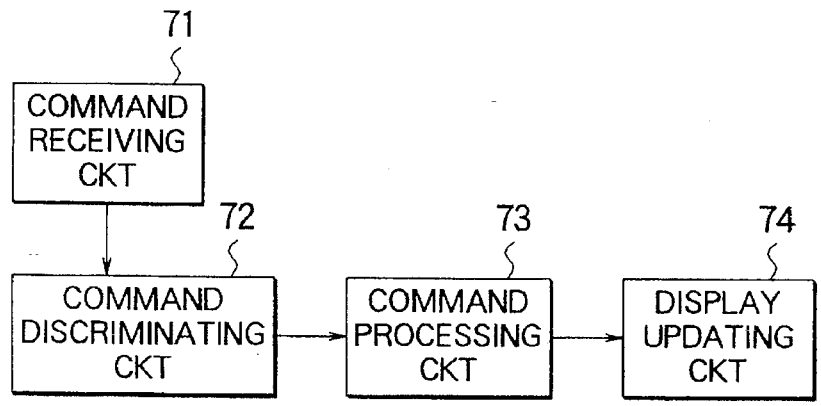
FIG. 1 is a functional block diagram of a conventional display control system.
Figure 2:
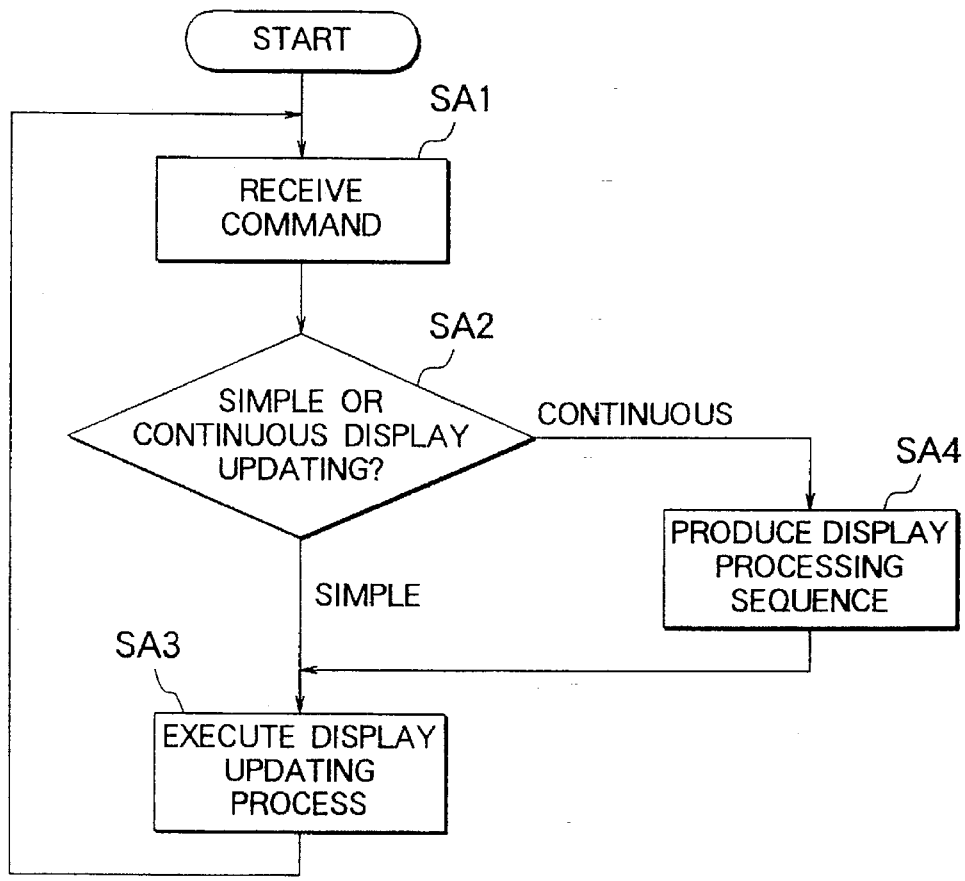
FIG. 2 is a flowchart of a control routine to be executed in the conventional display control system for updating a screen display.
Figure 3:
FIG. 3 is a diagram showing an example of a display processing sequence for a continuous command.

For a better understanding of the present invention, description will be made at first as regards a conventional display control system corresponding to the prior art example that is described in the preamble part. FIG. 1 is a functional block diagram of the display control system for consecutively changing display states of a window to realize a visual effect, such as, wipe, fade-in, fade-out, zoom-in or zoom-out. FIG. 2 is a flowchart of a control routine for performing such consecutive changing of the display states. The display processing sequence represents a procedure of the display processing for providing the required visual effect. FIG. 3 shows an example of a display processing sequence for providing the visual effect "fade-out". As appreciated from FIG. 3, the display processing sequence 40 defines 20 steps (items 41-49) for updating translucency of the window.

In FIG. 1, a display updating command issued by an application software is received by a command receiving circuit 71. Then, a command discriminating circuit 72 selects a proper process based on the display updating command received by the command receiving circuit 71. The selected process is executed by a command processing circuit 73 as a display updating process. In case of a continuous command requiring periodic repetition of uniprocessing to be executed for a given time period, such as, a wipe command, a fade-in command, a fade-out command, a zoom-in command or a zoom-out command rather than a simple command requiring uniprocessing to be executed for a short time period, such as, a segment drawing command, the command processing circuit 73 produces a display processing sequence and executes display updating processes periodically based on the produced display processing sequence. Results are reflected on a display screen via a display updating circuit 74.

Now, an operation of the conventional display control system will be explained hereinbelow with reference to FIGS. 2 and 3 together with FIG. 1.

In the flowchart of FIG. 2, the command receiving circuit 71 receives a display updating command from the application software at a first step SA1. Subsequently, at a second step SA2, the command discriminating circuit 72 checks whether the received command is a simple command or a continuous command. Assuming that it is a fade-out command, i.e. one of the continuous commands, the command processing circuit 73 produces the display processing sequence 40 shown in FIG. 3 at a fourth step SA4. Subsequently, the routine proceeds to a third step SA3 where the command processing circuit 73 updates a translucency rate by 5% per 50 msec. A result of each updating process is reflected on the display screen via the display updating circuit 74. On the other hand, assuming that the received command is the segment drawing command, i.e. one of the simple commands, the routine proceeds from the second step SA2 to the third step SA3 where the command processing circuit 73 executes a display updating process corresponding to the segment drawing command so as to update the display screen via the display updating circuit 74. After execution of the third step SA3, the routine returns to the first step SA1 for awaiting the next occurrence of a display updating command from the application software.

Accordingly, in the foregoing conventional display control system, the command receiving circuit 73 is disabled to receive a new display updating command from the application software until completion of the third step SA3. Thus, while processing the continuous command, that is, for a period of one second in case of the fade-out processing sequence 40 shown in FIG. 3, it is impossible to process other simple command/commands and/or continuous command/commands, meaning that it is disabled to achieve the visual effects based on the continuous commands simultaneously for a plurality of the windows, or execute the segment drawing while processing the continuous command to provide the visual effect.

Figure 4:
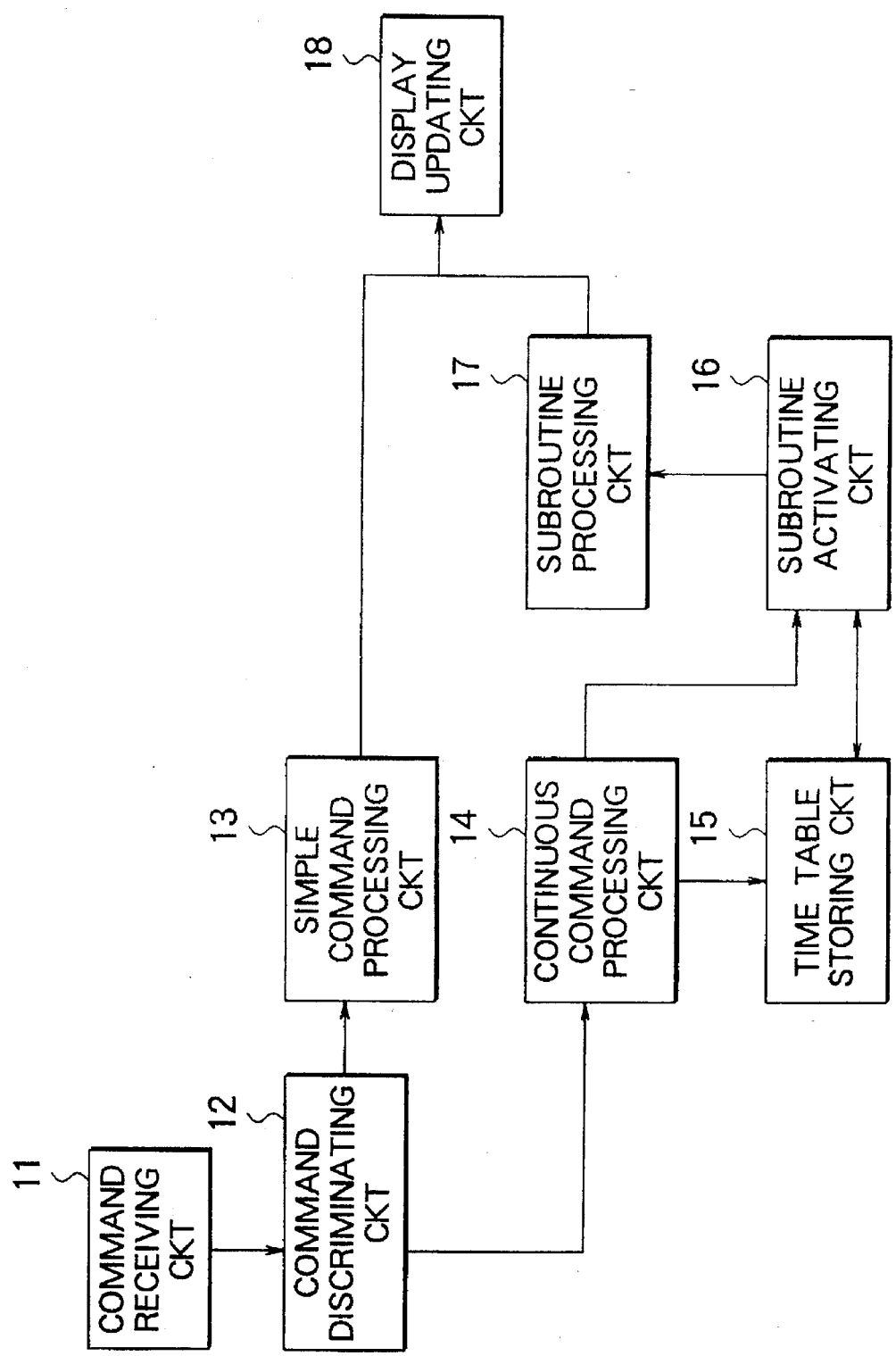
FIG. 4 is a functional block diagram of a display control system according to an embodiment of the present invention.

Now, the description will be directed to a display control system according to an embodiment of the present invention. FIG. 4 is a functional block diagram of a display control system according to the embodiment of the present invention. In FIG. 4, the display control system includes a command receiving circuit 11 for receiving a display updating command from an application software, and a command discriminating circuit 12 connected to the command receiving circuit 11 for determining whether the received display updating command is a simple command for requiring a simple display updating process or a continuous command for requiring a continuous display updating process. The simple display updating process represents uniprocessing, such as, graphics drawing, which is completed in a short time, while the continuous display updating process represents periodic repetition of uniprocessing which repetition is completed in a given relatively long time for providing, such as, the foregoing visual effect. The display control system further includes a simple command processing circuit 13 connected to the command discriminating circuit 12 for performing a screen updating process in response to the simple command, a continuous command processing circuit 14 connected to the command discriminating circuit 12 and responsive to the continuous command for producing a display processing sequence as a procedure for updating a screen display as required by the received continuous command, and a time table storing circuit 15 connected to the continuous command processing circuit 14 for storing a time table to be written with the display processing sequence. The display control system further includes a subroutine activating circuit 16 connected to the continuous command processing and the time table storing circuits 14 and 15 and periodically activated to access the time table for activating a subroutine to be executed at that time point, a subroutine processing circuit 17 connected to the subroutine activating circuit 16 for executing the subroutine, and a display updating circuit 18 connected to the simple command processing and the subroutine processing circuits 13 and 17 for reflecting a process result from the simple command processing circuit 13 or the subroutine processing circuit 17 on a display screen.

Figure 5:
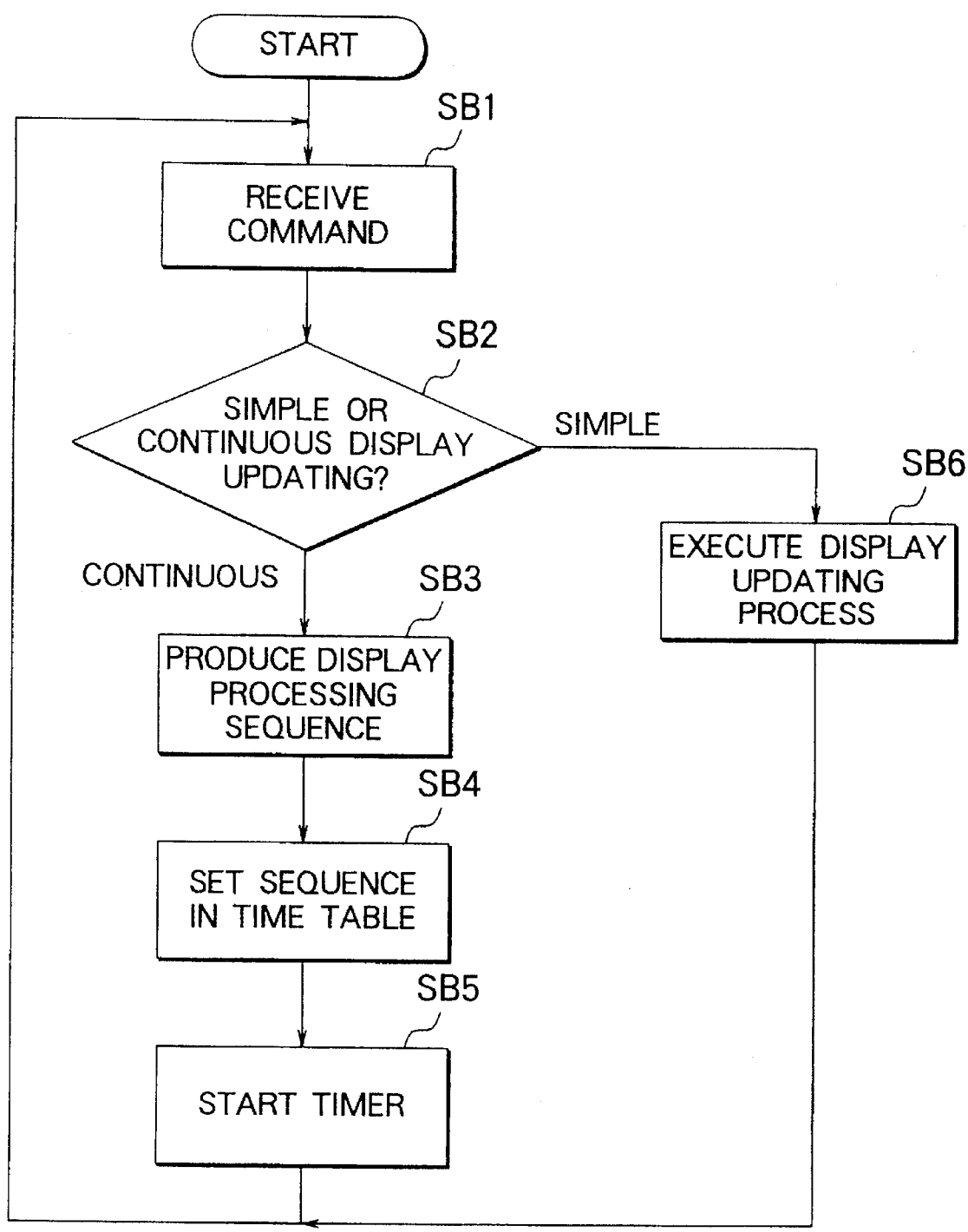
FIG. 5 is a flowchart of a main routine to be executed in the display control system shown In FIG. 4.
Figure 6:
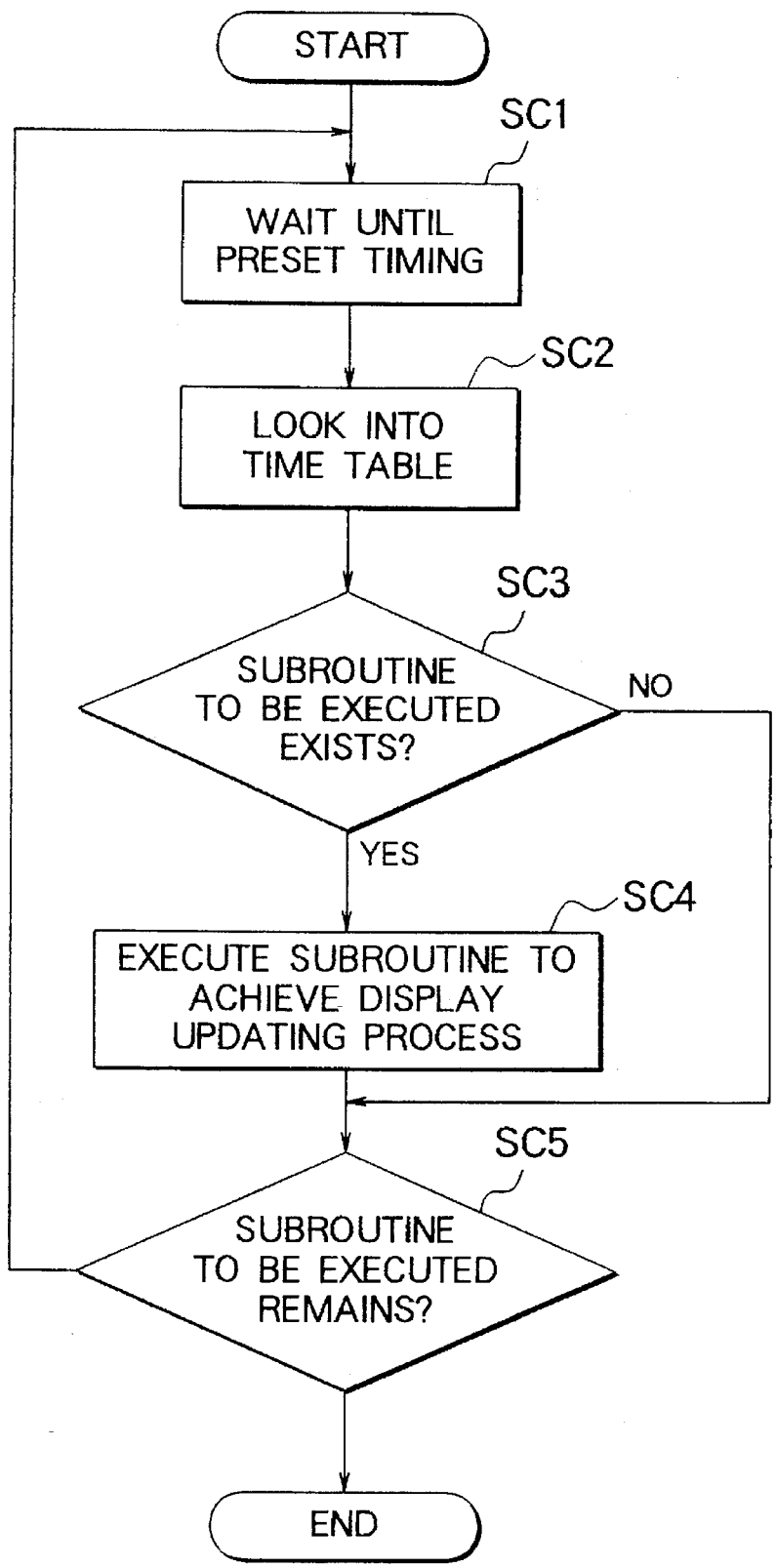
FIG. 6 is a flowchart representing operations of subroutine activating means and subroutine processing means of the display control system shown in FIG. 4.

FIG. 5 shows a flowchart of a main routine to be executed in the display control system of this embodiment, and FIG. 6 shows a flowchart which represents operations of the foregoing subroutine activating circuit 16 and the subroutine processing circuit 17. FIG. 3 shows, as described before, the example of the display processing sequence for the visual effect "fade-out" FIGS. 5 and 6 show examples of the time table, respectively.

Now, an operation of the display control system according to this embodiment will be described hereinbelow.

In the flowchart of FIG. 5, the command receiving circuit 11 receives a display updating command from the application software at a first step SB1. Subsequently, at a second step SB2, the command discriminating circuit 12 determines whether the received display updating command is the simple command or the continuous command. If it is the simple command, such as, the segment drawing command, the routine proceeds to a fifth step SB6 where the simple command processing circuit 13 calculates coordinate values on the display screen and sets various attribute values, such as, colors and dash patterns so as to update the screen display via the display updating circuit 18. Thereafter, the routine returns to the first step SB1 for awaiting the next occurrence of a display updating command from the application software.

On the other hand, if it is the continuous command, such as, the window fade-out command at a second step SB2, the routine proceeds to a third step SB3 where the continuous command processing circuit 14 produces the display processing sequence 40 shown in FIG. 3. Subsequently, at a fourth step SB4, the display processing sequence 40 is mapped or set in a time table 50 (FIG. 7). Thereafter, the routine proceeds to a fifth step SB5 where a timer is started, and then returns to the first step SB1 for awaiting the next occurrence of a display updating command from the application software.

Referring now to FIG. 6, the subroutine activating circuit 16 waits until the timer counts up a given value at a first step SC1, and then looks into the time table 50 of the time table storing circuit 15 at a second step SC2. Specifically, the subroutine activating circuit 16 looks into the time table 50 at every given timing, such as, 50 msec. As appreciated, the time table 50 is an example which is to be accessed at every 50 msec. At a third step SC3, it is checked whether there is a subroutine to be executed. According to an item 51 of the time table 50, it is judged that there exists a subroutine to be executed at TIME=50 msec. Thus, the subroutine activating circuit 16 calls the corresponding prestored subroutine and activates the subroutine processing circuit 17 which, at a fourth step SC4, executes the called subroutine so as to set a translucency rate of the window to 95%, that is, the translucency rate is reduced by 5%. Then, the display updating circuit 18 updates the screen display accordingly.

As appreciated, in practice, the foregoing operations of the subroutine activating circuit 16 and the subroutine processing circuit 17 are realized by a timer interrupt routine which is executed at every given timing counted by the timer, such as, at every 50 msec. Accordingly, the foregoing steps SC2 through SC4 may form the timer interrupt routine.

At the next execution cycle of the timer interrupt routine, the subroutine activating circuit 16 again checks the time table 50 at the second step 32 and determines at the third step SC3 whether there is a subroutine to be executed. According to an item 52 of the time table 50, it is judged that there exists a subroutine to be executed at TIME=100 msec. Thus, the subroutine activating circuit 16 calls the corresponding prestored subroutine and activates the subroutine processing circuit 17 which, at the fourth step SC4, executes the called subroutine so as to set a translucency rate of the window to 90%, that is, the translucency rate is further reduced by 5%. Then, the display updating circuit 18 updates the screen display accordingly. In this manner, the second through the fourth steps SC2 to SC4 are repeatedly executed until all the items in the time table 50 have been processed. Accordingly, when the second step SC2 is executed at 1,050 msec after the start of the timer to look into the time table 50, no step remains to be processed so that the routine terminates via fifth step SC5. In this case, the timer is reset for awaiting the next execution of the fifth step SB5 in FIG. 5.

In the foregoing manner, the window fade-out updating process required by the application software is accomplished. Now, a further operation of the display control system will be described, wherein a further continuous command is received from the application software while a certain continuous command is processed.

It is assumed that a continuous command 1, such as, a fade-out command is received at the first step SB1 in FIG. 5, and the second through the fifth steps SB2 to SB5 and the second through the fourth steps SC2 to SC4 are executed as described above. It is further assumed that a continuous command 2, such as, a fade-out command is further received at the first step SB1 after the subroutine activating circuit 16 has processed an item TIME=750 msec in the time table 50. At the second step SB2, the command discriminating circuit 12 determines that the command 2 is a fade-out command. Subsequently, at the third step SB3, the continuous command processing circuit 14 produces the display processing sequence 40 based on the command 2. Then, at the fourth step SB4, the produced sequence 40 is written in the time table 50 of the time table storing circuit 15 so as to produce a time table 60 as shown in FIG. 8. As appreciated from the time table 60, a time period of 750 msec, which is a time period from starting the timer at the fifth step SB5 to producing the time table 60, is added to values of TIME of the display processing sequence for the command 2. Further, items of the time table corresponding to TIME<800, which have already been processed, are deleted. As appreciated, since the fifth step SB5 has been executed before to start the timer for the command 1, the fifth step SB5 is not executed at this time, and the routine returns to the first step SB1 for awaiting the next occurrence of a display updating command from the application software.

The timer interrupt routine is executed at every 50 msec in the same manner as described before. Accordingly, the subroutine activating circuit 16 periodically looks into the time table 60 of the time table storing circuit 15 at the second step SC2. Since answer at the third step SC3 is positive at this time, that is, it is judged according to an item 61 of the time table 60 that there are subroutines to be executed, the subroutine processing circuit 17 executes the corresponding prestored subroutines so as to set a translucency rate to 20% for the command 1 and to 95% for the command 2 at the fourth step SC4. Then, the display updating circuit 18 updates the screen display accordingly. As described before, the timer interrupt routine is repeatedly executed until all the items of the time table 60 have been processed. Accordingly, when the second step SC2 is executed at 1,900 msec after the start of the timer to look into the time table 60, no step remains to be processed so that the routine terminates via the fifth step SC5. In this case, the timer is reset for awaiting the next execution of the fifth step SB5 in FIG. 5.

In the foregoing manner, a plurality of the continuous display updating processes are executed simultaneously.

As appreciated, when a simple command is received from the application software while the continuous display updating process is executed, the simple display updating process is executed at the fifth step SB6 in FIG. 5 without awaiting completion of the continuous display updating process.

While the present invention has thus been described in connection with a single embodiment thereof, it will readily be possible for those skilled in the art to put this invention into practice in various other manners. For example, in the foregoing embodiment, all the display processing sequence/sequences are set in the time table of the time table storing circuit, However, it may be arranged that a title of a subroutine to be executed next is only stored in the time table, and that every time the subroutine is executed, the subroutine by itself stores in the time table a subroutine title to be executed next. Further, the time table is not necessarily in the form of "table", but may be in the form of one of various other data structures, such as, a combined list.

What is claimed is:

1. A display control system for performing a screen display, comprising:
    command receiving means for receiving a display updating command from an application software to produce a received display updating command;
    command discriminating means connected to said command receiving means for determining whether said received display updating command is a simple command requiring a simple display updating process or a continuous command requiring a continuous display updating process;
    simple command processing means connected to said command discriminating means for executing a screen updating process in response to said simple command;
    continuous command processing means connected to said command discriminating means and responsive to said continuous command for producing a display processing sequence defining a processing procedure for updating the screen display as required by said continuous command;
    time table storing means connected to said continuous command processing means for storing a time table to be written with said display processing sequence;
    subroutine activating means connected to said time table storing means and periodically activated for looking into said time table and activating a subroutine to be activated at that time point;
    subroutine processing means connected to said subroutine activating means for executing said subroutine; and
    display updating means connected to said simple command processing means, said subroutine processing means, and said the screen display for reflecting a process result of said simple command processing means or said subroutine processing means on said screen display.

2. A display control method of performing a screen display, comprising the steps of:
    receiving a display updating command from an application software;
    determining whether the received display updating command is a simple command requiring a simple display updating process or a continuous command requiring a continuous display updating process;
    updating, when said received display updating command is the simple command, the screen display in response to said simple command;
    producing, when said received display updating command is the continuous command, a display processing sequence;
    setting said display processing sequence in a time table and starting a timer; and
    looking into said time table and executing a display updating process identified in said time table for that time point, as a timer interruption which is caused at every given timing defined by said timer, so as to perform the display updating process consecutively.

3. A display control system for performing a screen display, comprising:
    receiving means for receiving a display updating command from an application software to produce a received display updating command;
    determining means connected to said receiving means for determining whether the received display updating command is a simple command requiring a simple display updating process or a continuous command requiring a continuous display updating process;
    producing means connected to said determining means and responsive to said continuous command for producing a display processing sequence for updating the screen display as required by said continuous command;
    storing means connected to said producing means for storing, as a stored display processing sequence, said display processing sequence in such a form that identifies display updating processes to be executed in terms of time;
    periodically accessing means connected to said storing means for periodically accessing said stored display processing sequence to execute required one of said display updating processes in terms of time, said periodic access and execution being performed as a timer interruption which is caused at every given timing; and
    updating means connected to said screen display and said periodically accessing means for updating the screen display every time said periodically accessing means executes said required one of the display updating processes.

4. A display control system as claimed in claim 3, wherein said display updating processes stored in said storing means are identified by titles of prestored subroutines, respectively.

5. A display control system as claimed in claim 3, wherein a timer is provided and started upon storing said display processing sequence in said storing means, and wherein said timer interruption is caused at every given timing defined by said timer.

6. A display control system as claimed in claim 3, wherein said storing means stores said display processing sequence in the form of a time table.

7. A display control system as claimed in claim 5, wherein said producing means produces a further display processing sequence even when a further continuous command is received while the execution of all of the display updating processes of said former display processing sequence is not completed, and wherein said storing means stores said further display processing sequence in such a form that identifies display updating processes to be executed in terms of time, said storing means storing said further display processing sequence along with said former display processing sequence such that a time period from starting said timer to storing said further display processing sequence is added to time values of said further display processing sequence.

8. A display control system as claimed in claim 7, wherein said periodically accessing means executes said required one of the display updating processes of said former display processing sequence and required one of the display updating processes of said further display processing sequence during the same timer interruption.

* * * * *